US006848133B2

(12) United States Patent
Tanaka

(10) Patent No.: US 6,848,133 B2
(45) Date of Patent: Feb. 1, 2005

(54) CARE BED

(75) Inventor: Yoshitaka Tanaka, Isahaya (JP)

(73) Assignee: Birumen Kagoshima Co., Ltd., Kagoshima (JP)

( * ) Notice: Subject to any disclaimer, the term of this patent is extended or adjusted under 35 U.S.C. 154(b) by 41 days.

(21) Appl. No.: 10/107,336

(22) Filed: Mar. 28, 2002

(65) Prior Publication Data

US 2003/0088918 A1 May 15, 2003

(30) Foreign Application Priority Data

Nov. 14, 2001 (JP) ....................................... 2001-349393

(51) Int. Cl.$^{7}$ ............................. A61G 9/00; A61G 7/02

(52) U.S. Cl. ........................ 5/604; 5/605; 5/606; 5/695; 5/928; 4/455; 4/453; 4/300.2

(58) Field of Search ............................ 5/604, 605, 606, 5/928, 910, 695; 4/450, 455, 300.2, 453

(56) References Cited

U.S. PATENT DOCUMENTS

| | | | | |
|---|---|---|---|---|
| 1,490,029 A | * | 4/1924 | Scheliga | 5/604 |
| 3,345,652 A | * | 10/1967 | Hiraga | 5/604 |
| 4,007,501 A | * | 2/1977 | Kato | 5/604 |
| 4,571,759 A | * | 2/1986 | Sasaki et al. | 5/604 |
| 5,351,349 A | * | 10/1994 | Tsai et al. | 5/604 |
| 5,363,514 A | | 11/1994 | Lee | |
| 5,513,404 A | | 5/1996 | Kanai | |
| 6,101,646 A | * | 8/2000 | Son | 5/604 |

FOREIGN PATENT DOCUMENTS

| | | | |
|---|---|---|---|
| DE | 43 33 530 | A1 | 4/1995 |
| DE | 296 12 166 | U1 | 9/1996 |
| EP | 1 101 464 | A1 | 5/2001 |
| JP | 57-40784 | B2 | 8/1982 |
| JP | 59-39137 | B2 | 9/1984 |
| JP | 63-11156 | A | 1/1988 |
| JP | 3011723 | U | 3/1995 |
| JP | 9-582 | A | 1/1997 |
| JP | 10-85275 | A | 4/1998 |
| JP | 10-113364 | A | 5/1998 |
| JP | 2001-314456 | A | 11/2001 |
| WO | WO 95/04513 | A1 | 2/1995 |

* cited by examiner

*Primary Examiner*—Sunil Singh
(74) *Attorney, Agent, or Firm*—Sughrue Mion, PLLC

(57) ABSTRACT

A care bed comprises a bed main body provided with an opening for elevating a bedpan, a bedpan assembled downward of the bed main body and supported in a freely elevating manner with respect to the bed main body, a bedpan elevating device that is moved between a lifted position in which the bedpan is lifted through the opening of the bed main body to above the bed surface and a descended position in which it is stored under the bed main body, and an excrement collecting device for sucking and collecting excrements from the bedpan.

15 Claims, 16 Drawing Sheets

CARE BED

RELATED APPLICATION

This application claims the priority of Japanese Patent Application NO. 2001-349393 filed on Nov. 14, 2001, which is incorporated herein by reference.

DETAILED DESCRIPTIONS

1. Field of the Invention

The present invention relates to a care bed comprised with a bedpan.

2. Background Art

An example of a prior art is disclosed in Japanese Patent Unexamined Publication No. 10-113364 (1998) that relates to a care bed comprised with a washing-type bedpan. This bed is arranged in that a seating portion of a washing bedpan appears when opening a lid that blocks an opening formed on a bed surface. A care-receiving person may take seat on the seating portion and after use of the bedpan, the excrement is washed in a washing style.

However, while the care-receiving person needs to move one's body to a position corresponding to the bedpan and further needs to take seat thereon, it is troublesome to move on one's own and it will be a great burden on a care-giving person in case the care-receiving person is unable to move on his or her own.

It is a subject of the present invention to provide a care bed enabling use of a bedpan on the bed and also reducing burden applied on care-giving persons and persons to be nursed.

The present invention includes a bed main body provided with an opening for elevating a bedpan, a bedpan assembled downward of the bed main body and supported in a freely elevating manner with respect to the bed main body, a bedpan elevating device that is moved between a lifted position in which the bedpan is lifted through the opening of the bed main body to above the bed surface and a descended position in which it is stored downward of the bed main body, and an excrement collecting device for sucking and collecting excrements from the bedpan.

The bed main body may be provided with a split mattress that covers the opening in normal conditions and that is pushed upward through lifting force of the bedpan when lifting the bedpan.

More particularly, the split mattress may be arranged in that it forms a flat mattress surface together with its peripheral mattress portion in normal conditions, in that it is raised in a suspended manner with respect to the peripheral mattress portion when lifting the bedpan and is maintained in this condition as long as the bedpan is in use, and in that it is descended together with the bedpan when descending the bedpan and assumes a form of a lid covering the opening of the bed main body after the bedpan has passed through.

The bedpan may be supported in a freely elevating manner with respect to the bed main body while the bedpan is also supported to be freely sliding in a direction that is in line with the bed surface when in the lifted position, and wherein the bed may further be provided with a bedpan sliding device for sliding the bedpan in the lifted position in a direction that is in line with the bed surface.

According to such an arrangement, since the bedpan is lifted (and slid) to approach a pubic region of a care-receiving person, the care-receiving person may easily use the bedpan on the bed and the care bed will be one that provides little burden on both, the care-receiving person and the care-giving person since the excrements are sucked and collected.

According to one preferred embodiment, the bedpan is supported through an elevating base so as to be freely elevating with respect to the bed main body, the elevating base being coupled to a frame of a bedpan unit that is provided to be freely sliding with respect to the bed main body through a parallel link mechanism; wherein an elevation driving device for swing driving the bedpan between the lifted position in which it is located above the bed main body through the parallel link mechanism and the descended position in which it is stored downward of the bed main body is provided whereas on the other hand, the bedpan is supported in a freely sliding manner with respect to the bed main body through the bedpan unit and a slide driving device for sliding the bedpan in the lifted position through the bedpan unit is provided.

The excrement collecting device for sucking and collecting excrements from the bedpan may include a suction hose for sucking excrements that is connected to the bedpan, a suction device that is connected to the hose for setting the interior of the hose to negative pressure so as to suck and transfer the excrements through the hose, an excrement tank for collecting excrements that are transported through the hose, and an excrement tank holder for fixing the excrement tank in a freely attachable/detachable manner, and a washing water supplying device for supplying washing water for washing excrements to a washing water discharge outlet of the bedpan may be provided, wherein waste water after washing is collected through the excrement collecting device together with the excrements.

In another preferred embodiment, a cleaning device for supplying a cleaning medium such as warm water for cleaning one's pubic region after excretion (hereinafter referred to as "warm water") from a warm water tank to the discharge outlet within the bedpan and for jetting the same through the discharge outlet is provided, wherein waste water after cleaning is received by the bedpan and collected through the excrement collecting device. A drying device for making warm air for drying one's pubic region after cleaning through the cleaning device blown out through an air-blowing outlet of the bedpan is also provided.

A circulating conduit may be formed for accumulating, at the time of collecting the sucked excrements into the collecting device together with air, the excrements in the excrement tank while only air is sucked to a sucking driving unit through a suction conduit and wherein pressurized air that has passed through the suction driving unit and that has become positive pressure on the downstream side is circulated to the bedpan side as air (pressure air) for sending out washing water and/or cleaning water to the bedpan. The pressurized air may also be circulated to the bedpan side to be utilized as air for drying one's pubic region after cleaning.

According to such an arrangement, upon utilizing the fact that air for sucking and collecting excrements and others is not only used for its sucking actions but also its properties that it becomes pressurized air downstream of the suction driving unit, air may be circulated to the bedpan side as pressure air for sending out washing water or warm water for cleaning and the suction driving unit may thus be concurrently used as a means for sending out washing water or warm water for cleaning. In this manner, the structure may be simplified and become compact when compared with a case in which an exclusive means for sending out is provided and at least a part of exhaust of suction air may be reduced so that its exhaust sound will be quiet and its odor reduced.

The circulating conduit is preferably provided with the discharge outlet for discharging a part of the circulating air to the exterior and an adjusting valve for adjusting the amount of discharge of air through the discharge outlet. By releasing a part of air in such a manner, suction force from the bedpan may be improved and the suction force may be further adjusted.

It should be noted that it is alternatively possible to provide an opening/closing valve in parallel to (or upstream of the discharge outlet and the adjusting valve) so as to generate maximum suction force at the time of sucking excrements, and it is also possible to close the opening/closing valve after temporary releasing all of air in the opened condition thereof to move a specified amount of air to be discharged from the adjusting valve. The adjusting valve and the opening/closing valve may also be replaced by a single valve device (for instance, a complex solenoid valve etc.) instead of providing them separately. It is further possible to employ an arrangement in which only the opening/closing valve is provided while the discharge outlet (adjusting valve) is omitted, and the opening/closing valve is opened when required.

According to a preferred embodiment, the bedpan comprises an opening for receiving excrements when being located to oppose one's pubic region and wherein a cover is provided to extend frontward from an upper portion of the opening, the cover being held by a holding mechanism which angle is adjustable, either in a multi-staged or non-staged manner, so as to adjust the size of the opening and to shield one's pubic region to be hardly visible from above.

By providing such a cover on the opening of the bedpan, excrements (and especially urine) can be prevented from scattering, and occurrence of scattering of warm water for cleaning or washing water may similarly be prevented upon shielding through the cover, and since the pubic region of the care-receiving person will be hardly visible, the sense of shame of the care-receiving person may be reduced at the time of using the bedpan.

DESCRIPTION OF THE PREFERRED EMBODIMENTS

Figure 1:
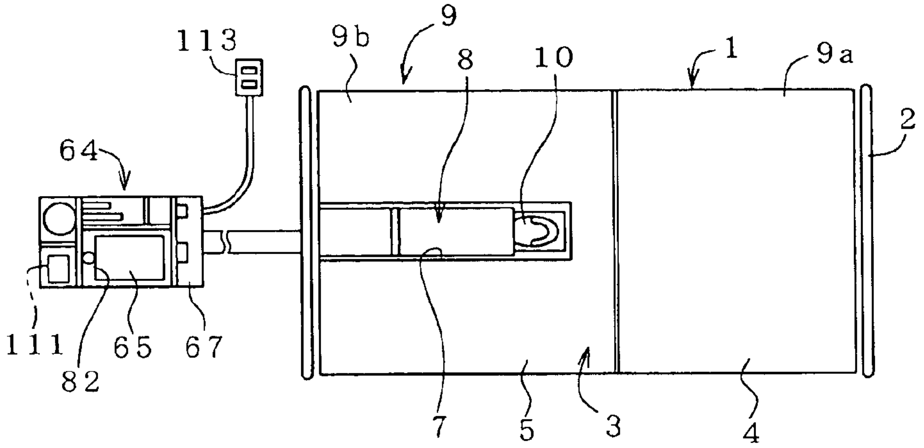
FIG. 1 is a simplified plan view of a care bed representing one embodiment of the present invention.

Forms for embodying the present invention will now be explained with reference to embodiments as illustrated in the drawings.

In FIGS. 1 to 5, 1 denotes a bed main body comprising a bed floor 3 on a bed frame 2, the bed floor 3 being separated into a backrest portion 4 which angle is variable and a position (e.g. horizontal) fixing portion 5. An opening 7 for elevating a bedpan is formed centrally of a downward foot portion of the position fixing portion 5 (hereinafter simply referred to as "bed floor 3"), wherein the opening 7 is normally closed by a split mattress 8 and its periphery is covered by a main body mattress 9.

A bedpan 10 is assembled downward of the bed main body 1 and supported with respect to the bed main body 1 to be freely elevating so as to raise the split mattress 8 through the opening 7 for lifting the bedpan 10 above the bed floor 3. The bedpan 10 is supported by a base 13 substantially parallel to the bed floor 3 while the base 13 is supported by a parallel link mechanism 14, and an actuator (elevation driving device) 15 is further provided for moving the bedpan 10 between a lifted position in which the bedpan is lifted above the bed floor surface through the opening 7 of the bed main body 1 and a descended position in which it is stored downward of the bed main body 1 while maintaining the substantial horizontal condition of the bedpan 10 to comprise a bedpan elevating device together with the link mechanism.

Figure 4:
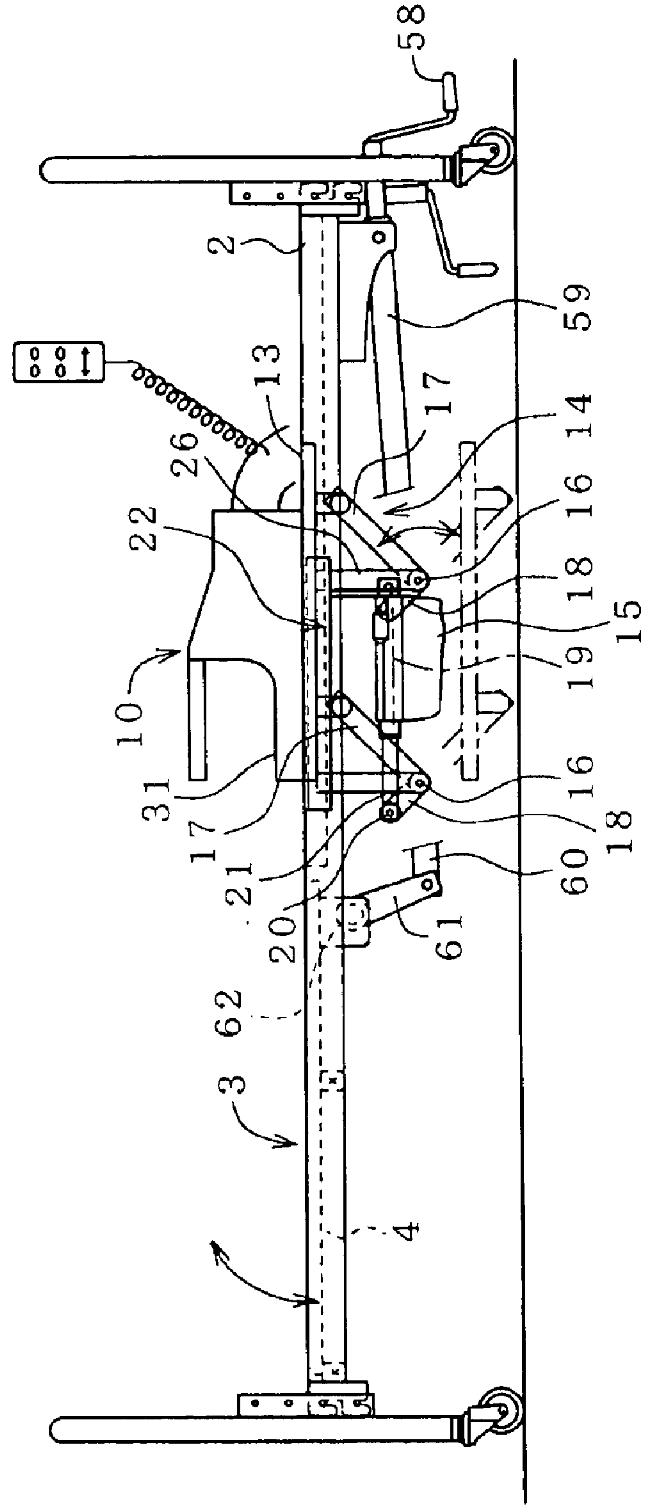
FIG. 4 is a side view of FIG. 3.

As illustrated in FIG. 4, the link mechanism 14 is arranged in that mutually parallel link members 17 one ends of which are respectively coupled to be freely rotating through a shaft 16 to a frame 26 of a bedpan unit 22 that is supported to the bed frame 2 in a sliding manner while the other ends are respectively coupled to the base 13 side to comprise the link mechanism 14 having a shape of a parallelogram. Lever links 18 are coupled to the shaft 16 while the lever links are mutually coupled in a coupling link 19 through a shaft 20, wherein a telescopic rod 21 of a driving device 15 is coupled to the shaft 20 at a free end portion of one lever link 18 while a main body portion of the driving device 15 is supported by the frame 26 of the bedpan unit 22 in a freely rotating manner.

The link member 17 and the lever links 18 are integrally combined through the shaft 16 such that their angles are invariable, and upon telescopic movements of the telescopic rod 21 of the driving device 15, the mutually parallel link members 17 are rotated within an angular range of substantially 900 through the lever links 18 for supporting the bedpan 10 in a lowermost position at a downwardly rotated position and for supporting the bedpan 10 in a lifted position in which it projects upward from the bed floor surface when in an upwardly rotated condition. The interior of the driving device 15 of this example is comprised with a screw shaft (not shown) that is rotated by means of a motor, and the above-described telescopic rod 21 may be expanded or shrunk upon forward or reverse rotation of the screw shaft.

The bedpan (supporting) unit 22 for supporting the bedpan 10 is for supporting all of the bedpan 10, the base 13, the link mechanism 14 and the driving device 15 (wherein all of these components may be referred to as the bedpan unit) and is supported to be freely sliding in front and rear directions of the bed (direction connecting a head portion side and a foot side of the bed) along guide rails 24 (FIG. 3 and others) formed on the bed frame 2. A telescopic rod 28 serving as a driving portion of the driving device (FIG. 3 and others) 27 for sliding the bedpan is coupled to a frame (unit frame) 26 of the bedpan unit 22, and the main body portion of a driving device 27 is supported with respect to the bed frame 2 at one end portion thereof to be freely rotating.

Similar to the above-described driving device 15, the interior of the driving device for sliding 27 is comprised with a screw shaft (not shown) that is driven by a motor, and the telescopic rod 28 may be either moved forwards or backwards through forward or reverse rotation of the screw shaft. The bedpan unit 22 could perform sliding movements in front and rear directions of the bed when the bedpan 10 is in the lifted position upon moving the telescopic rod 28 forwards or backwards.

Figure 9:
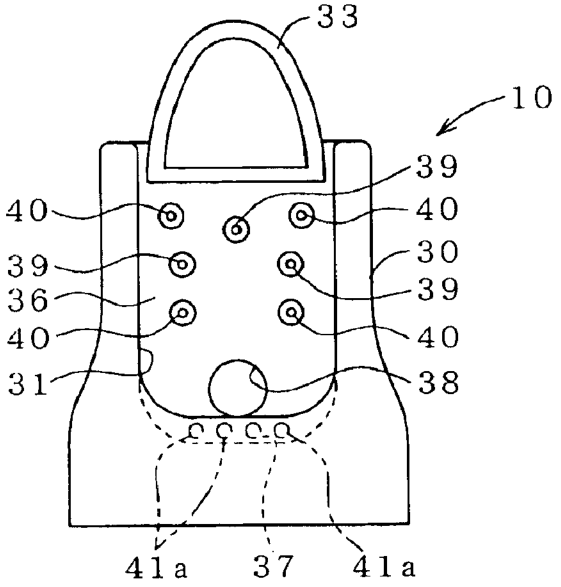
FIG. 9 is a front view of the bedpan of the care bed.
Figure 10:
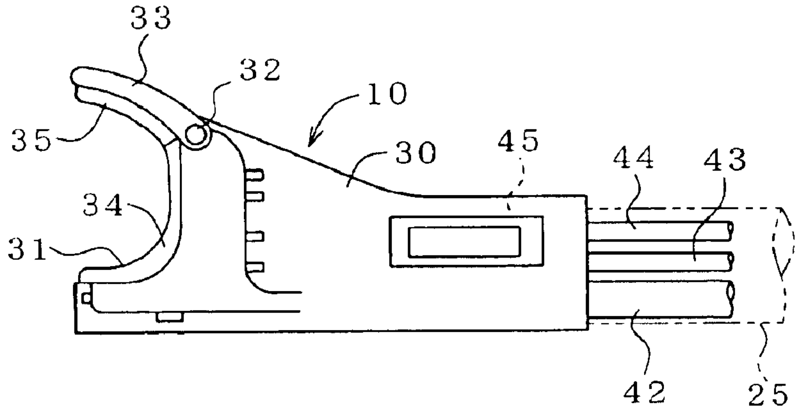
FIG. 10 is a side view of FIG. 9.
Figure 11:
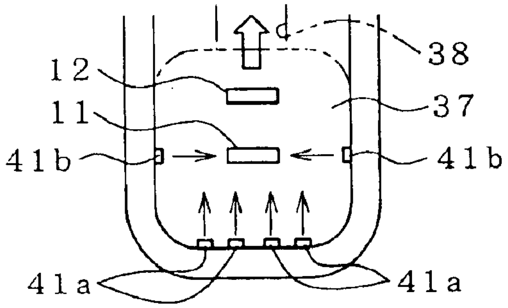
FIG. 11 is a plan view of a front side portion of FIG. 12

As illustrated in FIGS. 9 to 11, the bedpan 10 is formed with a base thereof being a bedpan main body 30 of laterally elongated type and includes an opening 31 at a front end thereof, the opening 31 being formed in an upwardly rising form after once retracting backwards by a specified extend along a bottom portion of the bedpan main body 30 and with a lid member 33 that may rotate in vertical directions being attached around a fulcrum 32 at an upper end portion thereof. Artificial skins (e.g. foamless urethane rubber as a gel-like member exhibiting elasticity) 34, 35 are fixedly attached as elastic members (these exhibit self-adhesiveness and may be fixedly attached to be freely attachable/detachable) so as to border outer edge portions of the opening 31 to the lid member 33 while bridging from downward surfaces of the opening 31 to the lid member 33, wherein these artificial skins 34 and 35 substantially form the opening of the bedpan 30 such that this portion is fitted against the pubic region of the care-receiving person (or is pressed against the pubic region for substantially close contact).

The lid member 33 is arranged in that its angle is adjustable in a multi-staged manner (or alternatively in a non-staged manner) through a section mechanism provided proximate of the fulcrum 32, and its angle may be adjusted to suit the body shape or the sex and other factors of a care-receiving person. As will be explained later, the lid member 33 is for preventing scattering of excrements or warm water and others to the periphery at the time of excretion, washing treatments after excretion or jetting warm water for cleaning one's pubic region, and further functions to cover the public region of a care-receiving person so as to reduce one's sense of shame at the time of excretion. A depth portion of the opening 31 of the bedpan 10 is formed as a rising wall 36 (FIG. 9) and a downward portion of the rising wall 36 comprises a bottom portion 37 of the opening. A suction inlet 38 for sucking excrements after excretion, treating water for washing and warm water after cleaning treatments is formed at a lower end portion of the rising wall 36.

The rising wall 36 is further formed with a plurality of, for instance, three warm water jetting outlets 39 and a plurality of (e.g. four) warm air blowing outlets 40 for drying one's pubic region that has been cleaned by the warm water. The warm water jetting outlets 39 concurrently serve as outlets for jetting water for washing treatment (washing water). The warm water jetting outlet 39 in the center of the upper portion jets warm water out in a spraying manner and is effective to serve, for instance, as a bidet. It is preferable that the remaining (right and left) warm water jetting outlets 39 are comprised with a rotating nozzle of e.g. spherical shape such that its jetting direction may be adjusted within a specified angular range such that linear jetting directions may be selected in accordance with the body shape or the sex of a care-receiving person.

The bottom surface 37 of the opening is similarly formed with a plurality of (e.g. four) warm water jetting outlets (for washing) 41*a* located frontward of the suction inlet 38 and a plurality of (e.g. two) warm water jetting outlets 41*b* located sideward on both sides. The jetting outlets 41*a* and 41*b* formed on the bottom surface portion of the opening are for washing treatments of excrements wherein water (warm water) is jetted rearward from the discharge outlets 41*a* formed on the low rising wall located frontward of the bottom surface 37 while water is jetted to a central side of the bottom surface through the discharge outlets 41*b* on both sides so as to enable easy introduction of excrements and washing water to the suction inlet 38. It should be noted that a sensor 11 (for stools) and a sensor 12 (for urines) for sensing excrements are provided on the bottom surface of the opening 37 of the bedpan 10 that are connected to a control unit of an accessory unit to be described later.

A warm water hose (cleaning hose) that is to be described later 43 is connected to the warm water (and concurrently washing treatment water) jetting outlets 39, 41*a* and 41*b* while a suction hose 42 is connected to the suction inlet 38 from rearward of the bedpan main body 30 upon respectively passing through the interior thereof. All of these hoses 42, 43 and 44 exhibit bending properties (while they may further be covered from outside by, for instance, a bellow-like hose cover 25) and exhibit warping properties that allow elevation and front and rearward sliding of the bedpan 10. It should be noted that air supplied through the air hose 44 is heated by a heater 45 provided inside of the bedpan main body 30 such that the heated warm air will be blown out through the warm water blowing outlet 40.

The base 13 to which the bedpan 10 is fixed (reference should be made to FIG. 12 and others) is provided with a stay 47 as a raising member or raising the above-described split mattress 8 at the time of lifting the bedpan 10. The stay 47 is of gate-like form comprising a raising and supporting portion 49 arranged to open in front and rear directions from an upper end of a column 48, wherein its lower end portion is fixed to a slider 50 while the slider 50 is assembled to the base 13 in a freely sliding manner. This is to enable the stay 47 to halt in a position in which it raises the split mattress 8 and to enable the bedpan 10 to move forward together with the base 13 towards a pubic region of a care-receiving person. It should be noted that a part of the stay 47 and more particularly, a shaft portion 51 formed at a lower portion thereof) engages with an elastic stopper member 52 provided on the slider 50 side. As long as no force sufficient for elastically deforming the elastic stopper member 52 is generated between the slider 13 and the stay 47, the stay 47 and the base 13, and in its turn the bedpan 10, will hold the integrated positional relationship while in case force exceeding a specified extend acts thereon, the part of the stay 47 will be detached from the elastic stopper member 52 to enable separation of the stay 47 and the bedpan 10. It should be noted that the upper end portion of the stay 47 may either be fixed to the split mattress 8 or coupled thereto so as to prevent separating therefrom.

The main body mattress 9 of the bed main body 1 (FIG. 1 and others) comprises a backrest corresponding portion 9*a* corresponding to the backrest portion 4 that rotates in the above-described manner and a mattress portion 9*b* corresponding to the position fixing portion 5 located on the opposite side, wherein the above-described split mattress 8 is provided to be elongated in front and read directions to block the opening 7 through which the bedpan 10 elevates and to be located centrally of the foot side of the bed such that the upper surface of the split mattress 8 and the upper surface of the main body mattress 9 are substantially formed on the same plane in normal conditions. The split mattress 8 includes one or a plurality of bending points 53 (reference should be made to FIG. 2 and others) such that it may be bent at its intermediate portion and is arranged to be bendable with the fulcrum being the bending point(s) 53. It should be noted that the mattress be alternatively elastic to be deformable in a curved manner instead of taking a bendable form. In this example, a single bending point 53 may be provided at an intermediate portion in a longitudinal direction of the split mattress 8 wherein a front end portion of the split mattress 8 may be formed as a free end portion while its rear end portion is coupled to a rear end portion of the main body 1 so as to restrict its position to prevent separation from the bed main body 1, and movements of the rear end portion of the split mattress 8 may alternatively be restricted by a movement restricting means such as a cam.

Figure 14:
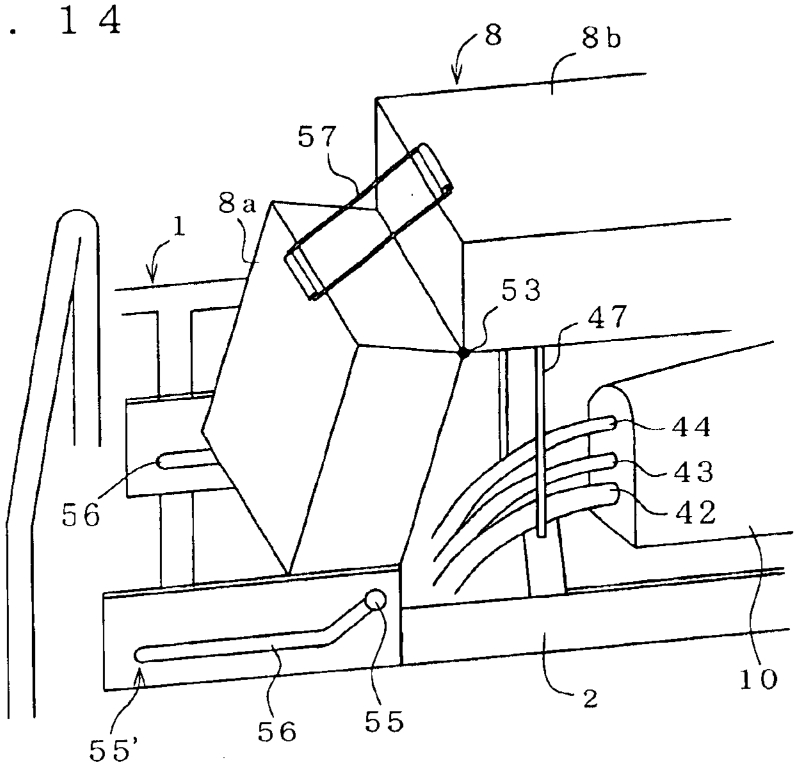
FIG. 14 is a perspective view illustrating a raised condition of the split mattress.

In an alternative example as illustrated in, for instance, FIG. 14, a shaft portion (cam follower) 55 provided at the rear end portion of the split mattress 8 may be arranged to engage with a groove-like cam 56 integrally formed with the rear end portion of the main body frame 2 such that the rear end portion of the split mattress 8 rises while moving forward along the cam 56 when the bedpan 10 is lifted and the split mattress 8 is pushed up through the stay 47. Vice versa, when the split mattress 8 is descended to become flat, the bent condition of the split mattress 8 may be eliminated with the fulcrum being formed by the shaft portion 55 of the split mattress 8 abutting against one end (rear end) 55' of the cam 56. It is also possible to provide an elastic member 57 between a rear-side portion 8*a* and a front-side portion 8*b* of the split mattress 8 for applying elastic force to both members in tensioning directions thereof. During the course of pushing the split mattress 8 up through the stay 47, the rear-side portion 8*a* and the front-side portion 8*b* are being bent accompanying the elastic deformation (expansion) of the elastic member 57, and vice versa, when the bedpan 10 is descended, the entire split mattress 8 is descended while returning the front-side portion 8*a* and the rear-side portion 8*b* to a linear condition (straight condition) through the elastic force of the elastic member 57 so as to enable smooth descending of the split mattress 8 and seating without large impact.

Figure 3:
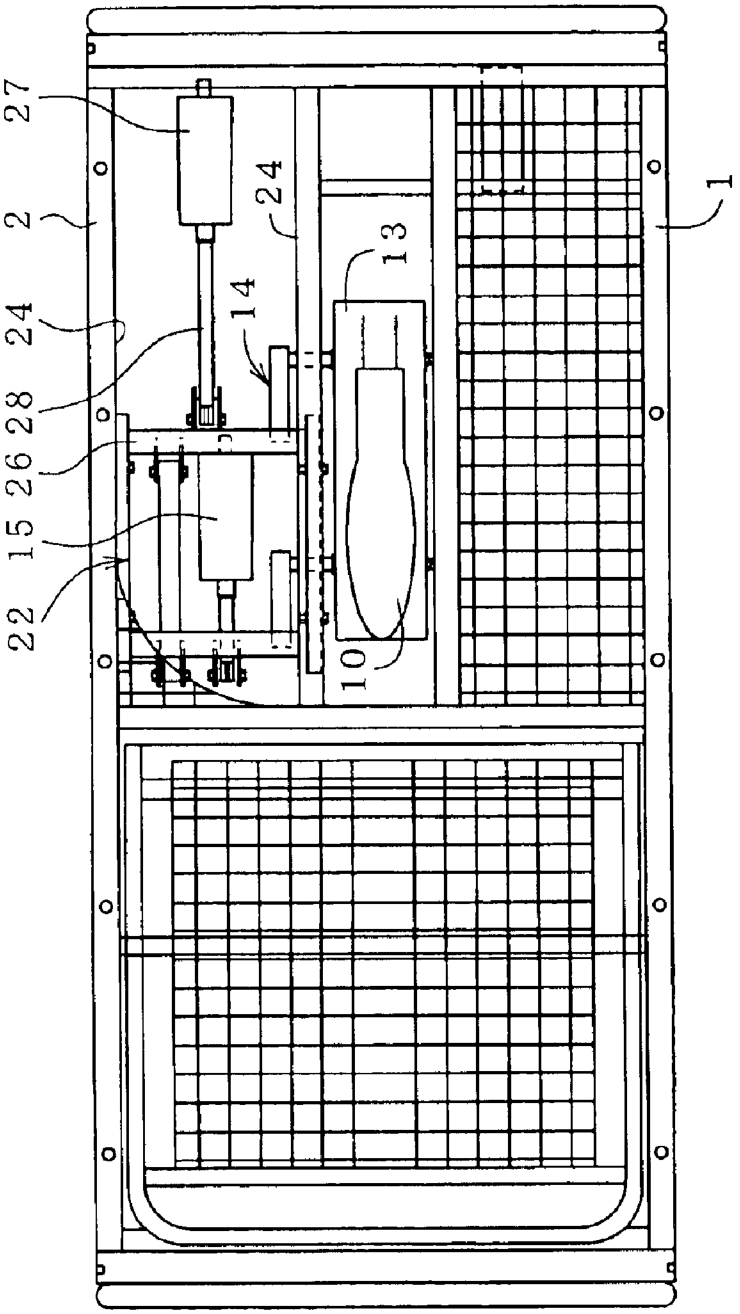
FIG. 3 is a plan view of a condition in which a mattress of the care bed has been removed.
Figure 5:
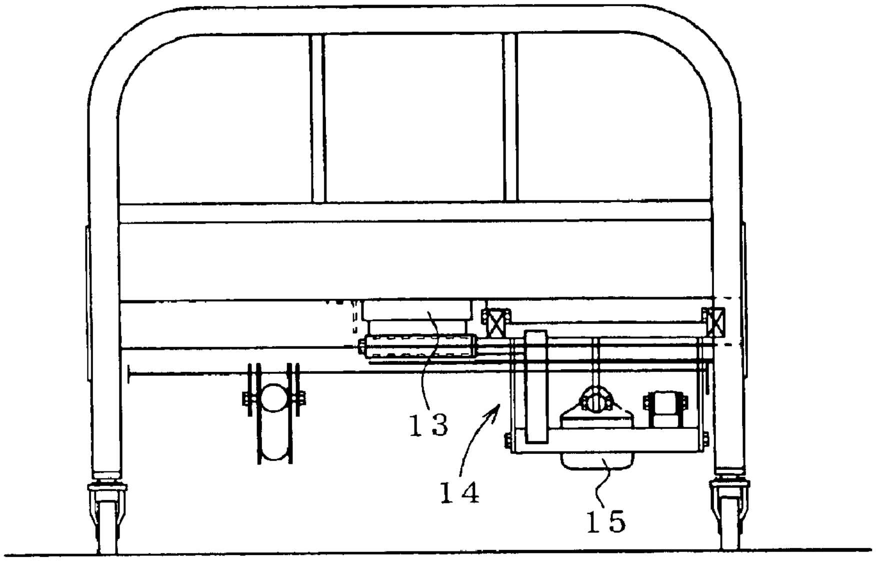
FIG. 5 is a rear view of FIG. 3.

As illustrated in FIGS. 3 and 5, the base 13 to which the bedpan 10 is fixed is located substantially in the center of the rearward side of the bed main body 1 while the driving device 15 and the link mechanism 14 for elevating the bedpan 10 is located sideward of the bedpan 10 and are supported by the frame (unit frame) 26 of the bedpan unit 22, wherein the unit frame 26 slides through the driving device for sliding 27 so that the bedpan 10 supported by the unit frame 26 is moved forwards and backwards together with the unit frame 26.

As illustrated in FIG. 4, a handle 58 for rotational operation is provided at a rear end portion of the bed main body 1 wherein the handle 58 is connected to a screw shaft 59 provided on a lower portion of the bed main body 1 and wherein a rod 60 that is moved forwards and backwards through the rotation of the screw shaft 59 is coupled to the lever 61 such that this lever 61 affects rotation of the backrest portion 4 of the bed floor 3 in a rising direction through a shaft 62 forming a fulcrum. It should be noted that the angle of the backrest portion 4 might also be varied through an actuator such as a motor or a cylinder instead of such a manually operated handle 58. The backrest 4 may be raised when using the bedpan 10 such that one's pubic region may adhere to the opening of the bedpan 10 in a substantially close manner while the care-receiving person is in a raised posture.

The suction hose 42, the warm water hose 43, and the air hose 44 extending from the bedpan 10 as illustrated in FIGS. 10 and 14 and others are connected to an accessory unit 64 (reference should be made to FIGS. 1 and 2) provided proximate to the bed main body 1 in a movable manner. The accessory unit 64 serves as an excrement collecting device for sucking and collecting excrements from the bedpan 10 while concurrently serving as a supply source (supplying device) for supplying warm water (also used as washing water) or warm air to the bedpan 10. The structure related to collection of excrements will first be explained.

Figure 2:
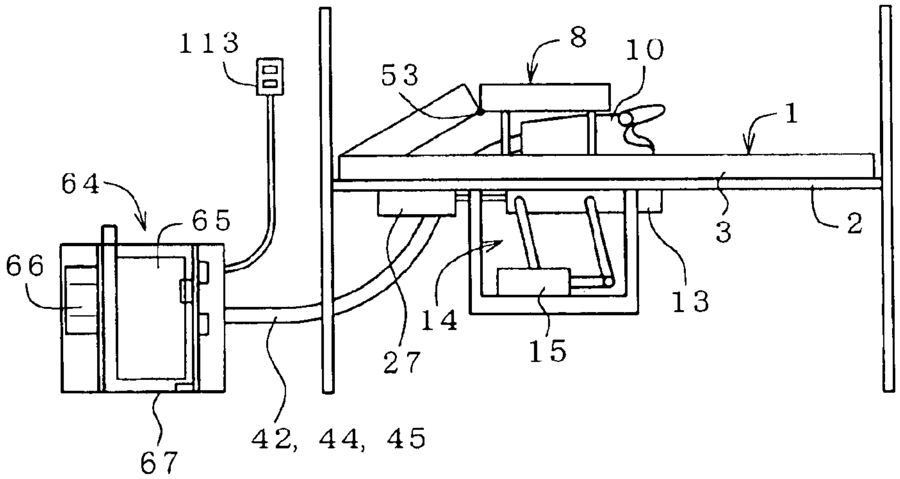
FIG. 2 is a simplified side view of a care bed representing one embodiment of the present invention.

The accessory unit 64 is provided with an excrement tank (hereinafter referred to as "waste water tank") 65 (wherein FIG. 2 illustrates a perspective view of the interior thereof). A fan and motor (hereinafter referred to as "fan motor 66") serving as a suction driving unit is provided downstream of the waste water tank 65, wherein driving of the fan motor 66 affects suction of excrements, washing treatment water (warm water etc.) and warm water after cleaning one's pubic region (hereinafter all together referred to as "waste water") through the suction hose 42 and accumulating the same in the waste water tank 65. The waste water tank 65 assumes a shape of a closed container and is accumulated within a tank accumulating space formed in a housing 67 of the accessory unit 64 upon dropping the same therein from above.

Figure 15:
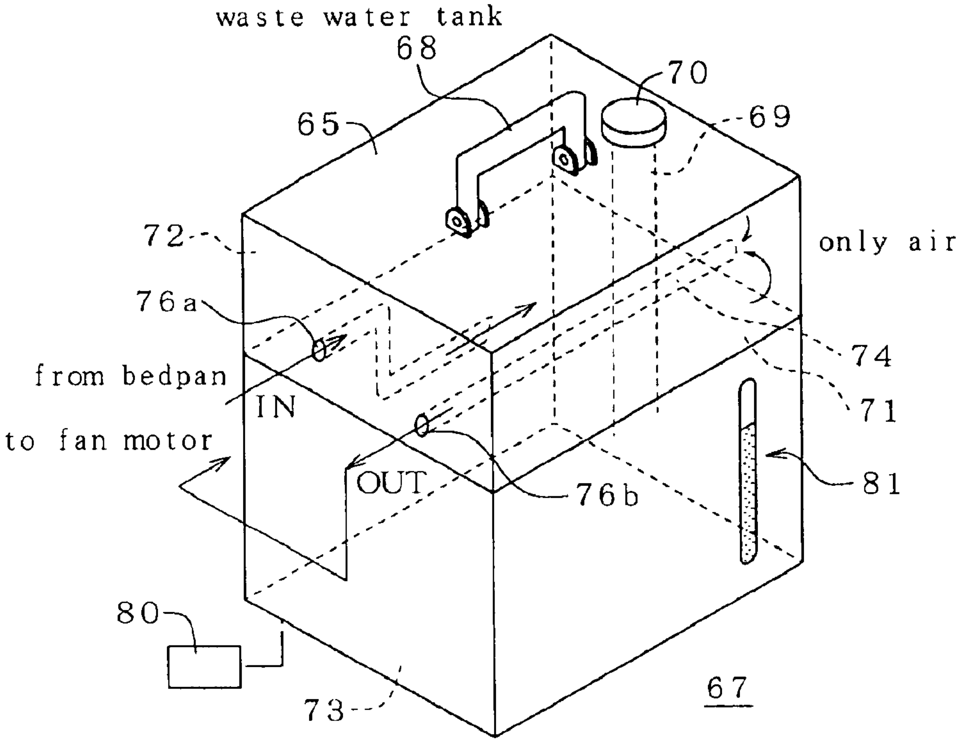
FIG. 15 is a conceptual perspective view of an excrement tank (waste water tank) disposed in an accessory unit.
Figure 16:
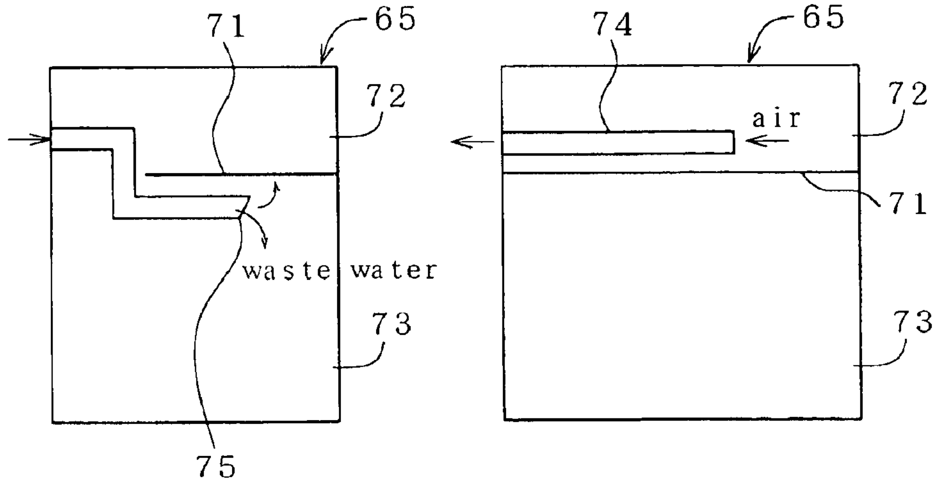
FIG. 16 is a view for explaining actions of a suction system of a waste water tank.

As illustrated in FIG. 15, a grip 68 is provided on an upper portion of the waste water tank 65 with a discharge portion 69 for the waste water being formed on an upper portion thereof which opening is closed by a cap 70. The waste water tank 65 assumes a shape of a box-shaped closed container which interior is divided through a partition 71 into a upper air sucking space 72 and a waste water accumulating space 73 downward thereof as illustrated in FIG. 16. Upon suction of air from the air sucking space 72 through an air conduit 74, which is affected by the fan motor 66, the interior of the tank 65 comes to negative pressure such that the above-described waste water is sucked. A discharge outlet 75 for the waste water is located downward of the partition 71 wherein scattering of waste water from the waste water accumulating space 73 can be prevented owing to the discharge of waste water through the discharge outlet 75 and only air is sucked through the air conduit 74 by the fan motor 66. A suction inlet (intake) 76*a* for sucking waste water (excrements, washing treatment water, and cleaning water etc.) from the bedpan 10 and a suction inlet 76*b* for further sucking air from the waste water tank 65 are formed on a part of an outer shell such as a wall surface of the waste water tank, wherein a waste water introducing conduit and an air suction conduit (not shown) formed in the accessory unit 64 are respectively connected for communication with the waste water tank 65 being mounted to and accumulated in the housing (case) 67.

Figure 17:
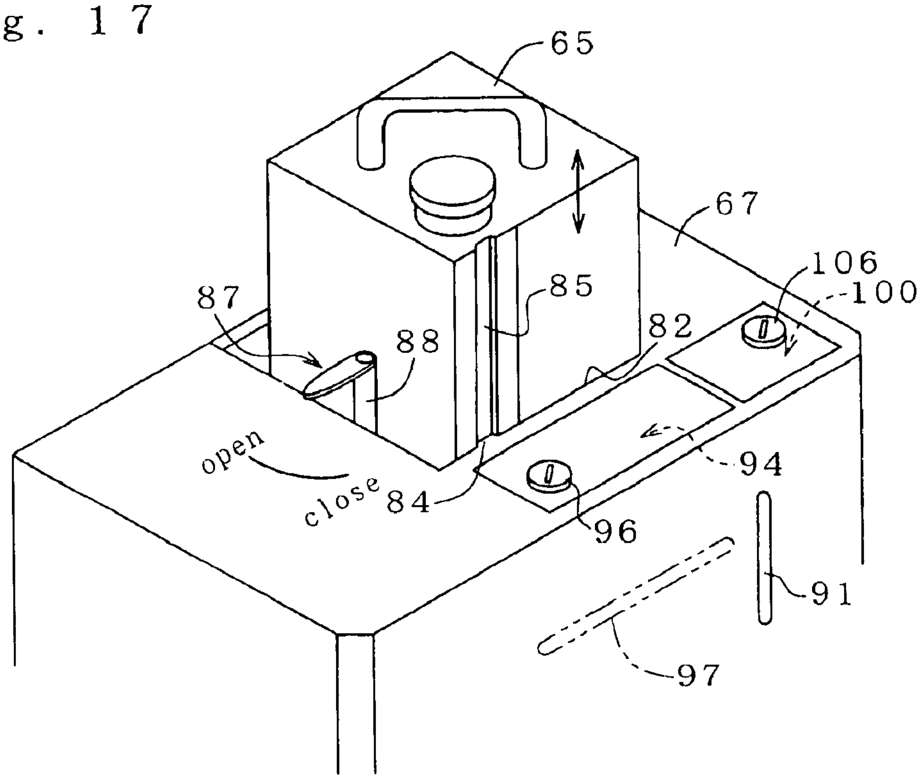
FIG. 17 is a perspective view of a condition in which the dirt tank has been detached from the accessory unit to an intermediate position.

The above-described discharge portion 69 is communicated to only the waste water accumulating portion 73 such that waste water accumulated therein may be discharged to a specified place from the discharge portion 69 upon taking the waste water tank 65 out from the housing 67 and inclining the same. It is possible to provide an alarming device 80 for informing that the waste water accumulated within the waste water tank 65 has reached a specified amount through a buzzer or a lamp or an indicator 81 enabling visual recognition from the exterior of the housing 67 that to what extent the waste water has been accumulated. As illustrated in FIG. 17, a convex portion 84 or a groove for guiding dropping of the tank 65 is formed in a tank accumulating space 82 formed in the housing 67 while a corresponding guide groove 85 or a convex portion is formed on the outer surface of the tank 65 such that the waste water tank 65 may be positioned in the tank housing space 82 through engagement of the concave/convex formed between the housing 67 and the waste water tank 65.

Figure 18:
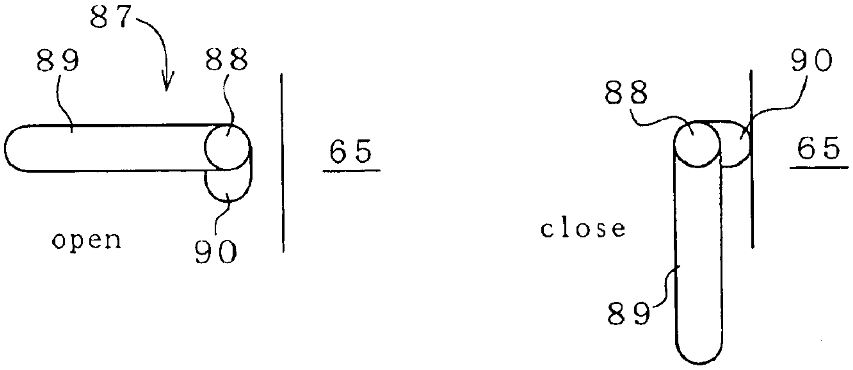
FIG. 18 is a view for explaining actions for fixing the waste water tank.

A stopper device 87 is further provided as a fixing means for fixing the housed waste water tank 65 within the tank housing space 82. As illustrated in FIG. 18, the stopper device 87 is arranged in that a lock lever 89 is mounted to a shaft 88 while a cam 90 serving as a stopper is further fixed to the shaft 88, wherein the cam 90 separates from the outer surface of the waste water tank 65 when the lock lever 89 is in an open position whereas upon substantially 90° rotation of the lock lever 89 to the closed position, the stopper cam 90 is pressed against the outer surface of the waste water tank 65. In this manner, the waste water tank 65 is pinched between the opposite sided wall surface of the tank housing space 82 and the cam 90 to be fixed thereat whereupon oscillation at the time of suction actions may be prevented or restricted whereas the above-described (FIG. 15) intake 76*a* for the waste water of the tank and the air suction inlet 76*b* on the wall surface of the waste water tank 65 are pressed against respective conduits (that are open to the wall surface of the tank accumulating space 82) to be connected to and are sealed thereat.

Figure 19:
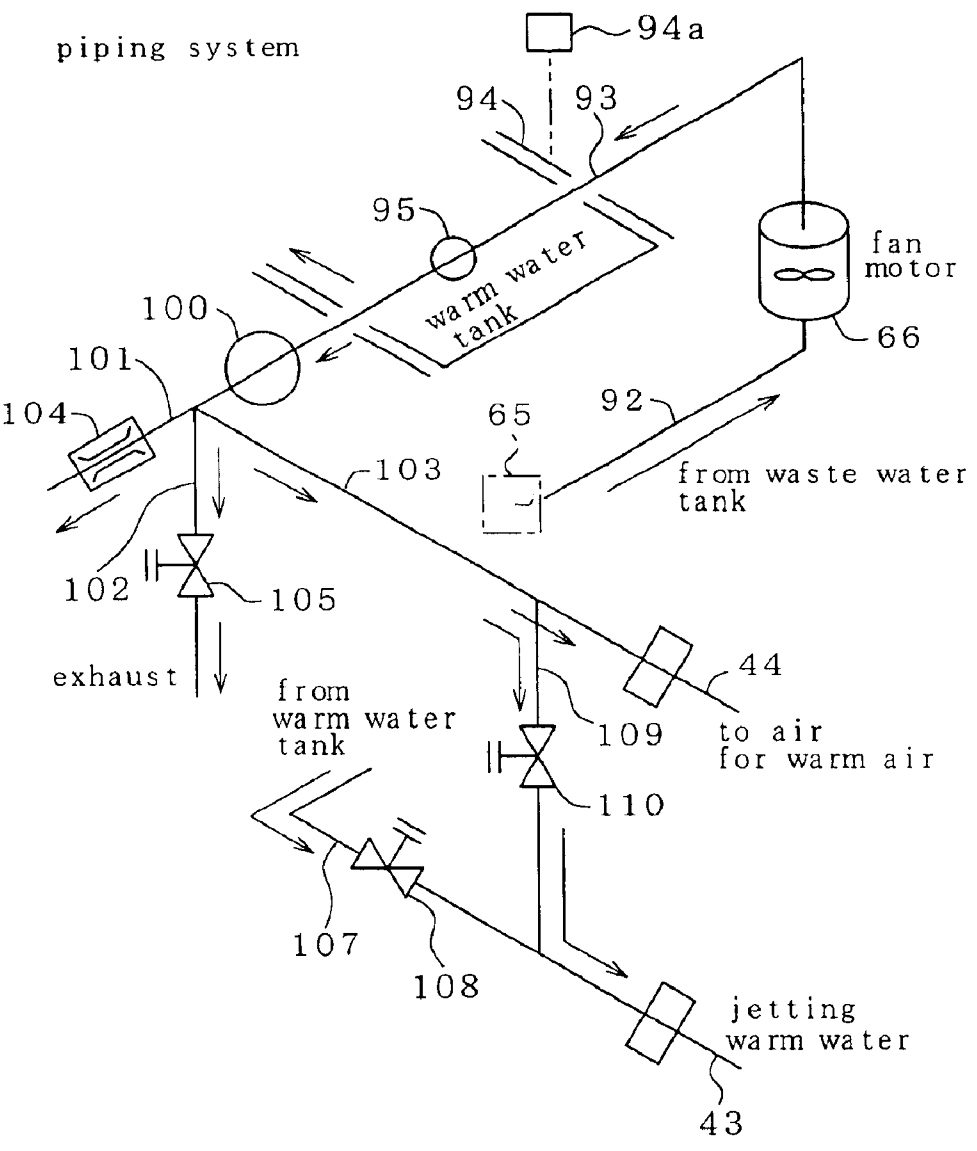
FIG. 19 is a view of a piping system for illustrating a piping system of the accessory unit.
Figure 20:
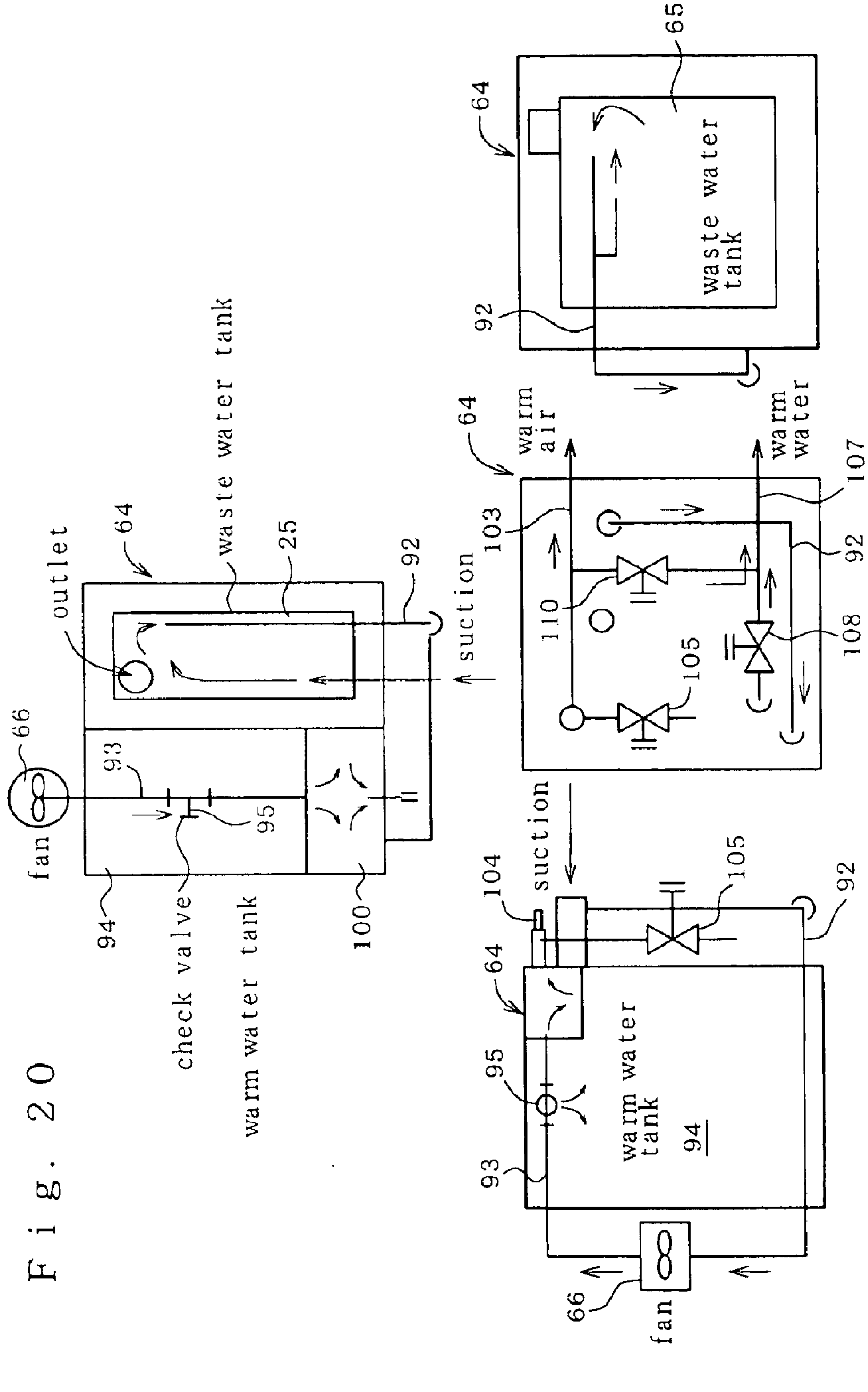
FIG. 20 is a view of a piping system as described to correspond to the plane and three lateral sides of the accessory unit.

As illustrated in FIGS. 19 and 20, air that is sucked from the waste water tank 65 is sucked by the fan motor 66 through a conduit 92 (which is provided either within or outside of the housing 67 of the accessory unit 64, and the same applies to any other conduits mentioned hereafter) and is further sent from the fan motor 66 to a warm water tank 94 side upon passing through a conduit 93. The side from which the air is sent is of positive pressure (pressurized air) The warm water tank 94 adjoins the waste water tank 65 and is provided either integrally with the housing 67 of the accessory unit or to be detachable and a specified amount of water may be supplied into the warm water tank 94 by detaching a lid 96 of a water supply inlet formed on an upper portion (reference should be made to FIG. 17 and others). A heater 97 is provided on a bottom portion of the warm water tank 94 for heating the water to a preliminarily determined temperature to obtain warm water and to stock the warm water.

The conduit 93 as illustrated, for instance, in FIG. 19, is arranged such that it passes through the warm water tank 94 and that air is supplied through the conduit 93 to the warm water tank 94 through a check valve 95 provided in the warm water tank 94 to pressurize the liquid surface of the warm water tank 94. However, it should be noted that no warm water of the warm water tank 94 will enter the conduit 93 through the action of the check valve 95. A notification means (means for urging supply of water) 94*a* for informing that the amount of warm water within the warm water tank 94 has become less than a specified amount is provided as an alarming device utilizing sounds of a buzzer or light of a lamp or the like. A liquid level indicator for indicating the level of currently remaining water within the warm water tank 94 or, alternatively, a water supply gauge 91 (FIG. 17) for indicating an amount of residue upon illuminating a part corresponding to a liquid level from among a plurality of lamps is provided.

The conduit 93 that has passed through the warm water tank 94 as illustrated, for instance, in FIG. 19 next reaches an deodorizing chamber 100 where odor is adsorbed such that the rest of air is sent out from the deodorizing chamber 100. The deodorizing chamber 100 is arranged in that a deodorizing liquid or similar is impregnated into a porous member such as a sponge-like member such that when air including some odor passes through, the odor is adsorbed or neutralized by the porous member and the deodorizing liquid for reducing the odor. An openable/closable lid 106 is provided at the deodorizing chamber 100 (FIG. 17) such that the deodorizing liquid may be replenished therefrom.

The conduit 93 as illustrated, for instance, in FIG. 19 for introducing air (pressurized air) that has passed through the deodorizing chamber 100 is bifurcated into three directions in a conceptual manner to be divided to conduit 101, 102, and 103. The conduit 101 is provided with a flow rate adjusting valve 104 which takes the form of a specified throttle (choke or orifice) upon variably throttling, and a part of pressurized air is allowed to be leaked by a specified amount to the exterior at an end portion of the conduit 101 or the conduit 93. The suction force of waste water based on the actuation of the fan motor 66 may be adjusted through this amount of leakage (amount of discharge), and the more the amount of air discharged from the flow rate adjusting valve 104 is increased, the more the suction force with respect to waste water may be increased.

The conduit 102 that is provided in parallel with the flow rate adjusting valve 104 is provided with a solenoid-type opening/closing valve 105 (hereinafter simply referred to as "solenoid valve") and by exhausting air that is send out from the fan motor 66 upon fully opening the solenoid valve 105, it is possible to achieve maximum suction force. However, performing exhaustion upon continuously opening the solenoid valve 105 may lead to noise in peripheries of the care bed or to smelling of odor, so that it is generally the case that only a part of air is exhausted by a specified amount through the flow rate adjusting valve 104.

A conduit 107 for sending out warm water is formed from the above-described warm water tank 94 (and preferably from a bottom portion of the tank) separate from the conduit 93 for sending out air, wherein the warm water hose 43 is connected to the conduit 107. The conduit 107 is provided with a solenoid-type opening/closing valve (solenoid valve) 108, wherein no warm water is supplied from the warm water tank 94 when the solenoid valve 108 is closed while warm water is supplied to the bedpan 10 upon passing through the conduit 107 and the warm water hose 43 upon opening the same. The driving force (pressurizing force) for supplying warm water is achieved by a part of pressurizing air that is sent out from the fan motor 66 pressing the liquid surface of the warm water tank 94.

The conduit 103 that has bifurcated from the above-described conduit 93 upon passing through the deodorizing chamber 100 is connected to the above-described air hose 44. Pressurized air that is sent out from the fan motor 66 is again sent out to the bedpan 10 through the air hose 44 and is warmed by the heater within the bedpan 10 to become warm air to thus be sent out from the warm air supplying outlet. As explained above, air passing from the fan motor 66 through the warm water tank 94 and the deodorizing chamber 100 by the conduit 93 is made to flow through the conduit 103 that is in parallel with the above-described air adjusting valve 104 and the solenoid valve 105, is bifurcated by a conduit 109 in front of the air hose 44 to be connected to the conduit 107 and is further connected to the warm water hose 43 upon passing through the conduit 107.

The conduit 109 for connection is provided with a solenoid-type opening/closing valve (solenoid valve) 110, wherein pressurized air that is sent out from the fan motor 66 flows to the air hose 44 when the opening/closing valve 110 is in a closed condition whereas the pressurized air is made to flow to the warm water hose 43 upon opening of the opening/closing valve 110 for pressurizing the warm water within the hose 43 and pressing the same out for discharge from the warm water discharge outlet of the bedpan 10. In other words, while supply of warm water is normally introduced from the warm water tank 94 to the bedpan 10 upon passing through the conduit 107 and the warm water hose 43, the solenoid valve 110 is opened at the stage cleaning of the pubic region of the care-receiving person is finished by using the warm water so that pressurized air is introduced from the conduit 103 through the conduit 109 and the solenoid valve 110 to the warm water hose 43 such that warm water remaining within the warm water hose 43 is pushed out.

The thus arranged accessory unit 64 is provided with the above-explained driving device 15 for elevating the bedpan 10, the driving device 27 for sliding, the fan motor 66, and a control unit 111 for actuating the solenoid valves 105, 108, and 110 (FIG. 1), and a remote controller unit 113 is provided as an operating means for the control unit 111. The remote controller unit 113 is provided with buttons (switches) for manually (through manual operations) instructing elevation or sliding of the bedpan 10, start or stop of the fan motor 66, supply of warm water, blow out of warm air etc. and further includes an operating unit such as buttons for selecting either the care bed is to be actuated in an automatic mode or in a manual mode for using the same through manual operation based on operations of the remote controller. In case the automatic mode is selected, movements of the bedpan or suction are fully automatically performed through a sequence circuit or sequence software provided in the control unit 111 of the accessory unit 64.

Figure 6:
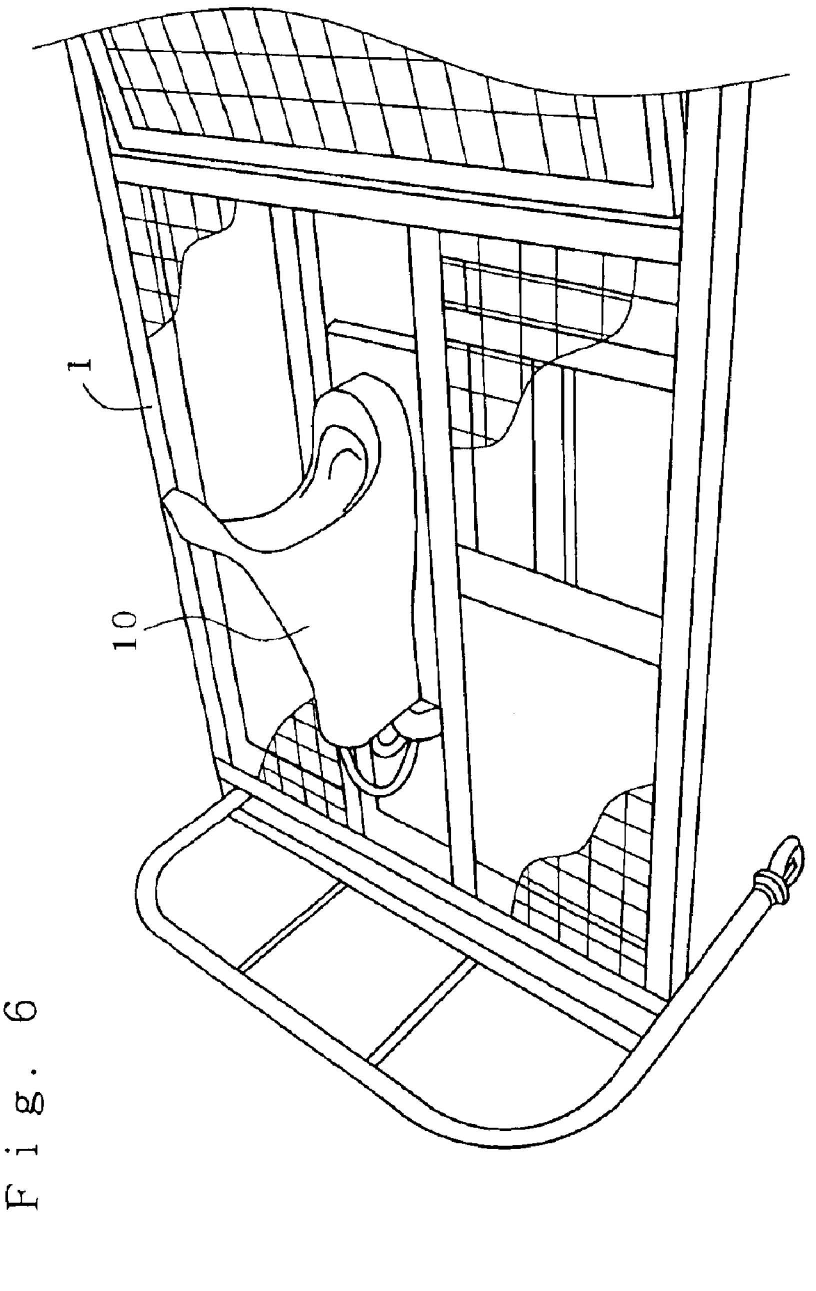
FIG. 6 is a perspective view of the care bed of FIG. 3.
Figure 7:
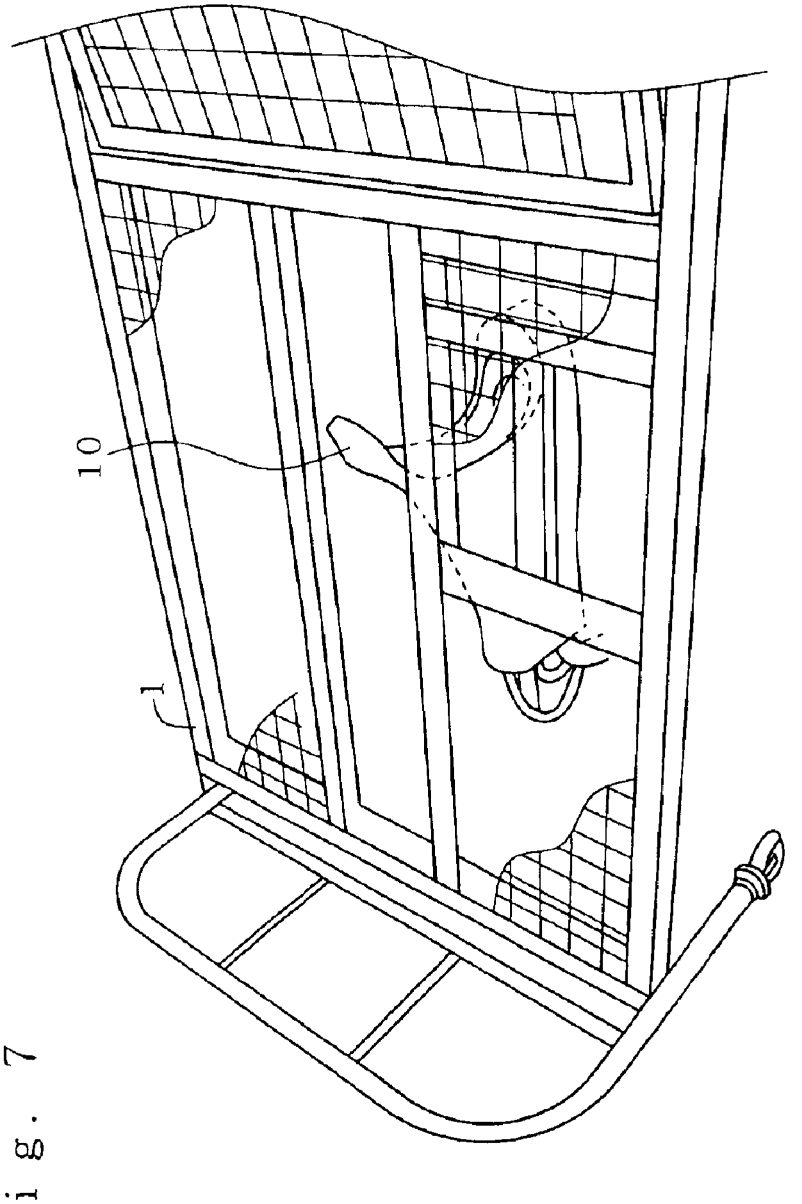
FIG. 7 is a perspective view illustrating a condition in which the bedpan of FIG. 6 has descended.
Figure 8:
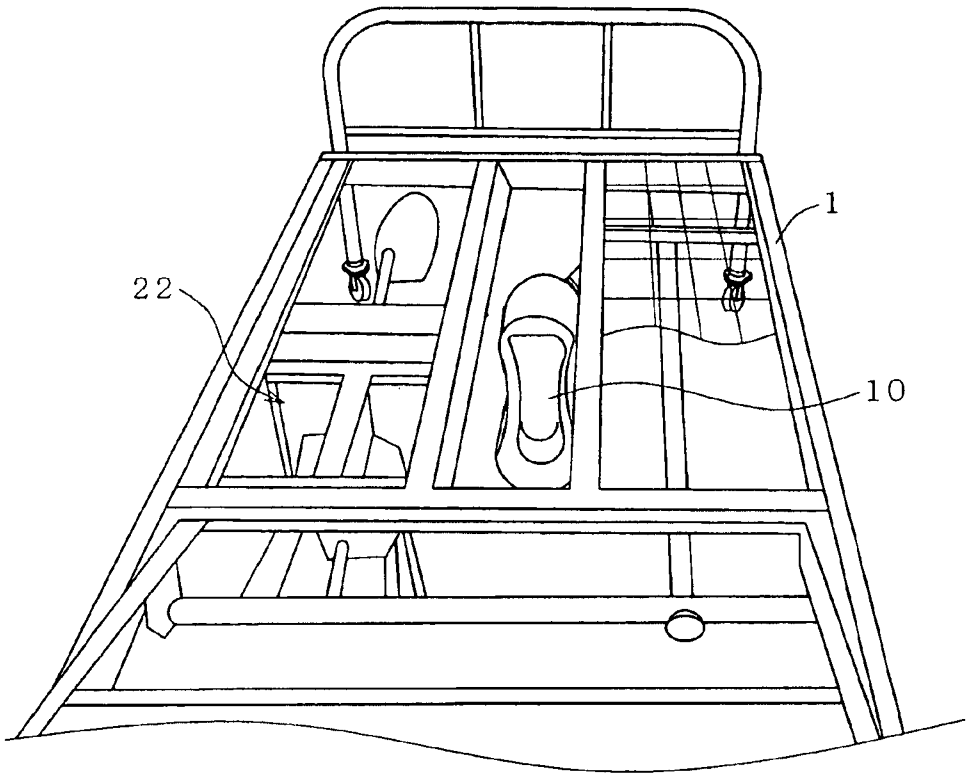
FIG. 8 is a perspective view illustrating the care bed of FIG. 7 seen from a head portion side of the bed.

Actions performed through fully automatic sequence control will now be explained. First, the bedpan 10 is in a retracted condition downward of the bed main body 1 (reference should be made to FIG. 7), wherein it is assumed that the bed floor 3 of FIG. 1 forms a substantially identical plane through the main body mattress 9 and the split mattress 8, and a care-receiving person is lying thereon. When using the bedpan, the backrest portion 4 is raised to a specified angle as necessary. Upon pressing a starting switch through the remote controller unit 113, the driving device 15 for elevating the bedpan 10 of FIG. 4 and others is actuated to project its telescopic rod 21 whereupon the bedpan 10 is raised through the parallel link mechanism 14 together with the base 13 to draw an upwardly directed arc-like orbit (an orbit that forms an concave when facing the pubic region of the care-receiving person) (reference should be made to FIG. 6). At this time, the split mattress 8 that blocks the opening 7 of the bed main body 1 is raised through the stay 47 provided on the base 13 (reference should be made to FIG. 2 and others) while the base 13 of the bedpan 10 is lifted to a level that is substantially identical to the bed floor 3 such that the bedpan 10 is in a condition in which it is exposed upward from the bed floor 3.

Thereafter, the driving device for sliding 27 of FIG. 3 is actuated and the entire bedpan unit 22 supporting the bedpan 10 and the base 13 is pushed by the expanding telescopic rod 28 to move forward, and the bedpan 10 approaches the pubic region side of the care-receiving person. It should be noted that FIGS. 3 and 6 to 8 illustrate a condition in which the main body mattress of the bed is detached wherein the latticed member illustrates a mattress supporting portion in which metallic bars or wire rods are formed into a lattice form (or a mesh form). When sliding the above-described bedpan 10, the care-receiving person opens his or her legs so as not to prevent the forward movement of the bedpan 10, and also at the time of lifting the bedpan 10 preceding the sliding, the person similarly opens his or her legs to enable raising of the split mattress 8. When the bedpan 10 moves forward until it substantially contacts the pubic region of the care-receiving person in a close manner, the driving device 27 for sliding is terminated. The angle of the lid member 33 of the opening 7 of the bedpan 10 is adjusted thereafter or prior to that (reference should be made to FIG. 10) for making the opening 31 of the bedpan 10 favorably put against the pubic region of the care-receiving person through the artificial skin 34 or 35 with regard to differences in body shape and sex of the care-receiving person and, in its turn, hiding the pubic region through the lid member 33.

Completion of urination or excretion is detected by the sensor 11 or 12. The fan motor 66 is consequently actuated so that suction force is applied to the bedpan 10 through the suction hose 42 while also acting pressurizing force of air onto the warm water tank 94 and opening the solenoid valve 108 whereupon warm water for washing is supplied into the bedpan 10 for sucking the excrements to the waste water tank 65 through the suction hose 42. At this time, the solenoid valve 105 is opened to set the suction force to a maximum level.

After elapse of a specified period of time, it is assumed that the excrements have been sucked whereupon the solenoid valve 105 is closed and warm water is jetted from the warm water supply outlet of the bedpan 10 for cleaning the pubic region of the care-receiving person after excretion by using the warm water. After jetting warm water for a specified period of time, the solenoid valve 110 (reference should be made to FIG. 19 and others) is opened for pushing warm water remaining in the warm water hose 43 out through pressurized air that is sent out from the fan motor 66. Warm water remaining in the warm water hose 43 will be cool such that cold water will be jetted at the next occasion of cleaning one's pubic region which is undesirable, and it is for preventing such conditions that the interior of the warm water hose 43 is emptied after supply of warm water.

The solenoid valve 110 is closed thereafter so that the pressurized air that is sent out from the fan motor 66 is sent to the bedpan 10 by passing through the conduits 93, 103, and the air hose 44. The pressurized air is heated by the heater 45 in the bedpan 10 (reference should be made to FIG. 10) to become warm air whereupon this warm air is blown out from the warm air blowing outlet 40 (reference should be made to FIG. 9 and others) for drying the pubic region of the care-receiving person after cleaning with the warm water. After blowing of warm air for a specified period of time, the fan motor 66 is terminated, whereupon the series of operations for sucking excrements and blowing out of warm water and warm air is completed.

The driving device 27 for sliding of the bedpan 10 (FIG. 3) is then actuated for retracting the bedpan 10 to be remote from the pubic region of the care-receiving person whereupon the driving device 15 for elevation is actuated (FIG. 4) upon which the telescopic rod 21 is shrunk for descending the bedpan 10 through the above-described link mechanism 14 to follow the arc-like orbit. At this time, the split mattress 8 that is raised by the stay 47 of the base 13 (FIGS. 12 and 14) is descended accompanying the descend while its movements are restricted by the cam 56 so as to finally return to the original position in which it becomes substantially planar with the main body mattress 9 and to block the opening 7 of the bed main body 1. When the bedpan 10 returns to the waiting position downward of the bed main body 1, the driving device 15 for elevation is terminated, and operations of a single cycle of sucking excrements, cleaning through warm water and drying through warm air and also returning the bedpan are thus completed.

It should be noted that in case manual operations are to be performed through the remote controller unit 113 instead of choosing the automatic mode, lifting and sliding of the bedpan 10, time for cleaning through warm water and drying through warm air can be suitably set at timings as instructed by the user upon operating the buttons.

Figure 12:
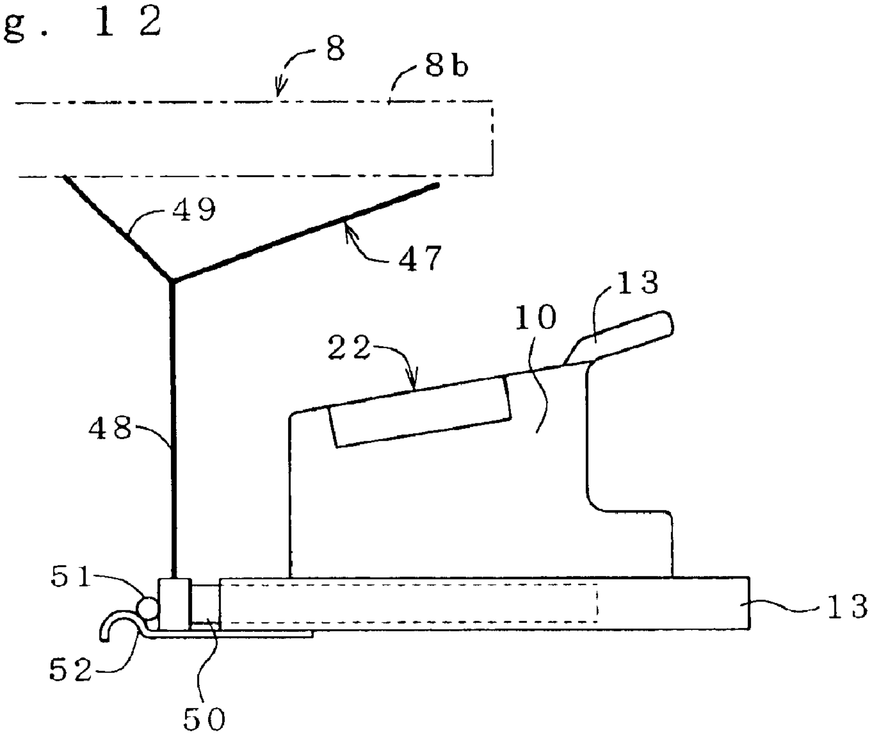
FIG. 12 is aside view illustrating a relationship between a stay on the bedpan side and a split mattress supported thereby.
Figure 13:
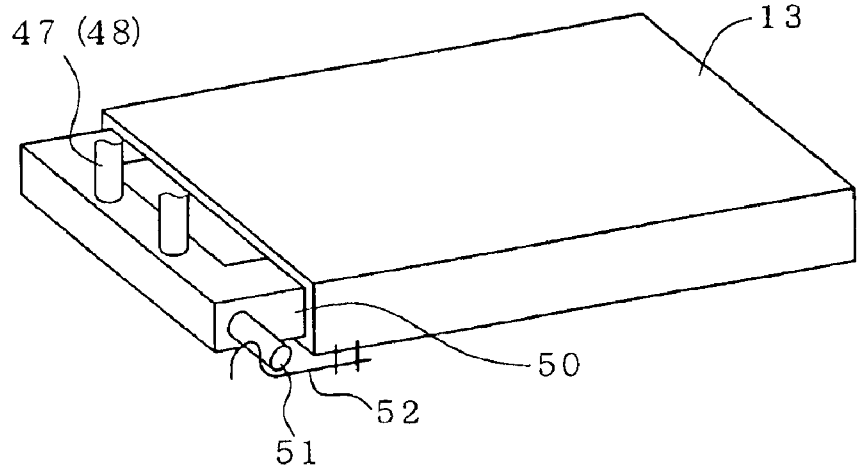
FIG. 13 is a perspective view illustrating a relationship between a base of a bedpan unit and a slider.

Movements of the stay 47 accompanying the bedpan 10 will be complementarily explained with reference to FIG. 12 and others. When the bedpan 10 is in a condition in which it is lifted above the bed together with the base 13, the stay 47 is raising the split mattress 8, and when the base 13 moves forward in this condition, load is applied onto the stay 47 through the split mattress 8 (and additional weight of beddings and others if present) such that the stay 47 tries to remain at the position while only the base 13 and the bedpan 10 moves forward. At this time, the shaft 51 of the stay 47 elastically deforms the elastic stopper member 52 to separate therefrom, and the bedpan 10 moves forward so as to separate the elastic stopper member 52 from the shaft portion 51 of the stay 47. On the other hand, when retracting the bedpan 10, the elastic stopper member 52 retracting with the base 13 will engage with the shaft portion 51 of the stay 47 proximate to a terminating end of retraction so that the stay 47 and the base 13 and, in its turn, the bedpan 10 may be descended down the bed while maintaining the integral positional relationship.

Additionally, in case there is the danger that the tip end of the bedpan 10 may hit (interfere) the pubic region of the care-receiving person when lifting the bedpan 10 through arc-like movements as illustrated in FIG. 4 and others, the driving device 27 (FIG. 3) is driven to first retract the entire bedpan unit 22 by a specified amount at the descended position of the bedpan 10 prior to lifting the bedpan 10 and then to lift the bedpan 10 along the arc-like orbit. After the lifting, the bedpan unit 22 and, in its turn, the bedpan 10 is slid forward through the driving device 27 for pushing the opening 31 of the bedpan 10 against the pubic region of the care-receiving person.

After processing of excrements and washing water, cleaning through warm water and drying through warm air, the bedpan unit 22 (the bedpan 10) is retracted to its limit of retraction, and the bedpan 10 is then descended to the descended position along the arc-like orbit. At the time of completion of descend, a specified clearance is formed between the tip end of the split mattress 8 and the main body mattress 9, and the split mattress 8 is moved forward by a small distance together with the bedpan unit 22 and the bedpan 10 in a last stage for filling this clearance whereupon the entire processes are completed.

Figure 21:
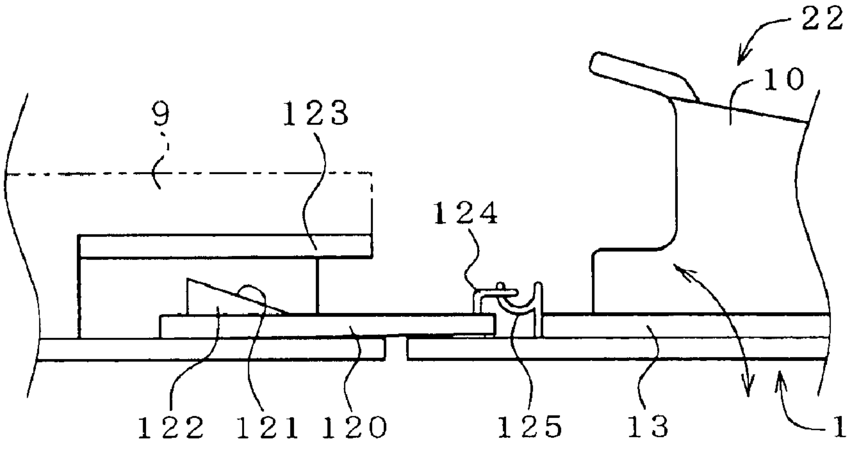
FIG. 21 is a side view illustrating a relationship between a slider including an inclined surface for guiding a tip end portion of the split mattress and the bedpan.
Figure 22:
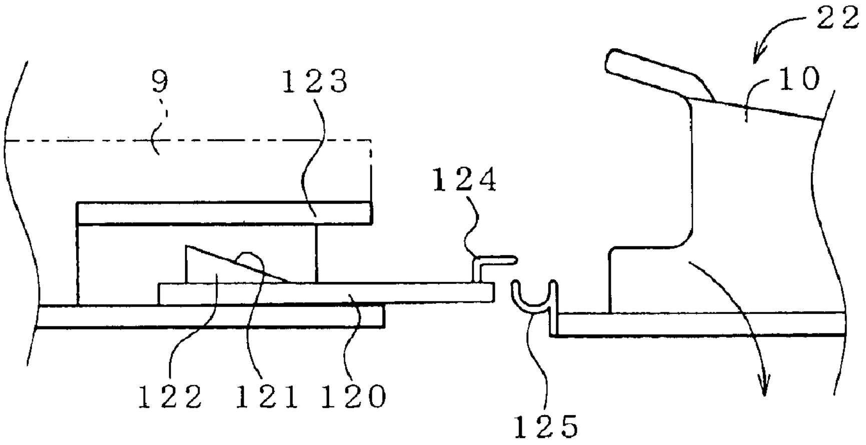
FIG. 22 is a side view illustrating a condition in which the bedpan of FIG. 21 has descended to separate from the slider.

In performing such operations, the following arrangements may be additionally provided. The bed main body 1 as illustrated in FIG. 21 is provided with a slider (inclined surface applying member) 120 that is movable in front and rear directions of the bed as a device for pushing up the tip end portion of the split mattress, wherein a cam block 122 for applying an inclined surface 121 is provided on the upper surface of the slider 120 (the slider 120 may be a cam member which itself includes an inclined surface 121). The inclined surface 121 of the slider 120 functions to lift the tip end portion of the split mattress 8 to climb along the inclined surface 121 accompanying the forward movement of the bedpan unit 22 and, in its turn, the bedpan 10 with the slider 120 being in a halted condition after the bedpan 10 has descended from the lifted position to the descended position and when the bedpan unit 22, the bedpan 10, and the split mattress 8 are moved forward by a small distance (reference should be made to FIG. 24) and to push the tip end portion of the split mattress 8 against proximate of the pubic region or the hip portion of the care-receiving person to push the same up from downward for returning to the bed condition prior to use of the bedpan.

If the tip end of the split mattress 8 would move forward as it is when returning to the original condition of the bed, it might happen that the tip end hits against the pubic region of the care-receiving person so that it cannot enter underneath there of in a favorable manner. However, by raising the tip end portion of the split mattress 8 from downward along the inclined surface 121 at the final stage of forward movement, it will be easier to enter the same under the proximity of the pubic region of the care-receiving person or his or her hip portion.

The slider 120 including the inclined surface 121 is supported to be slidable in front and rear directions of the bed and the slider 120 (inclined surface 121) is made to enter downward of a cover 123 provided on the bed main body 1 when the bedpan 10 is not in use. The cover 123 is provided for supporting the main body mattress 9 and for forming a space downward thereof into which the slider 120 is allowed to enter (for preventing a condition in which the slider 120 is hindered through interference with the mattress 9). While the space into which the slider 120 may enter is formed on the upper surface of the bed in this example, it may alternatively be formed on the lower surface of the bed as long as the split mattress 8 may be raised along the inclined surface 121. The reason for arranging the slider 120 movable in front and rear directions is for retracting the slider 120 and particularly its inclined surface 121 under the cover 123 when the bedpan 10 is not in use such that it is not located on the bed surface (the inclined surface 121 causes discomfort also with the split mattress 8 being interposed between), for preventing interference with the sliding of the bedpan 10, and since the slider 121 is pulled out from the interior of the cover 123 after the bedpan 10 has been used for returning the split mattress 8 to the original position for raising the split mattress 8 along the inclined surface 121 in a region in front of the cover 123.

The forward and rearward sliding movements of the slider 120 are performed by utilizing the front and rearward movements of the bedpan unit 22 (and, in its turn, the bedpan 10) after lifting, and the retracting movements (prior to descending) of the bedpan unit 22 after use of the bedpan. The slider 120 is provided with a coupling portion 124 for temporal coupling with the bedpan 10, and the bedpan unit 22 or the bedpan 10 (in this case, the base 13) is provided with a similar coupling portion 125 (in this example, an elastic hook portion as an elastic coupling portion) for temporal coupling. A stopper mechanism is provided between the slider 120 and the bed main body 1 for preventing forward movement of the slider 120 accompanying friction between both members when the split mattress 8 is raised along the inclined surface 121 of the slider 120.

Figure 23:
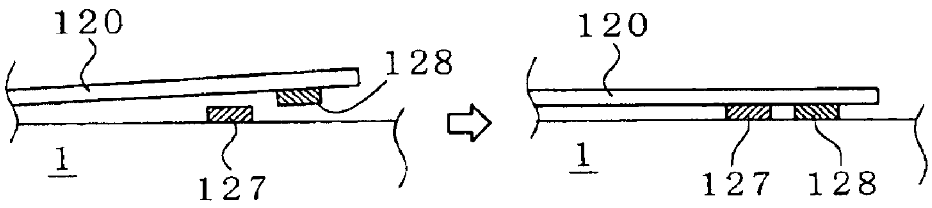
FIG. 23 is a conceptual side view of a stopper mechanism for the slider and the bed main body.

As illustrated in FIG. 23, an upwardly projecting convex stopper 127 is formed in this example on the upper surface of the bed main body 1 on which the slider 120 moves (movement supporting surface or rail surface) and a downwardly projecting convex stopper opposing portion 128 is formed on the lower surface of the slider 120 so as to prevent the slider 120 moving frontward to the cover 123 side by abutting the stopper opposing portion 128 against the stopper 127. However, when the coupling portion 125 of the bedpan unit 22 draws an arc-like orbit from downward to engage with the coupling portion 124 of the slider 120, the coupling portion 125 on the bedpan unit 22 side raises the rear end of the slider 120 such that the stopper opposing portion 128 is allowed to pass above the stopper 127 as illustrated in FIG. 23, and the slider 120 may thus move to the end position of forward movement of the bedpan unit 22 together with the bedpan unit 22 with the slider 120 being coupled to the bedpan unit 22. During the course of movement, the slider 120 enters downward of the cover 123, and the backrest portion 4 of the main body mattress 9 may be raised within a specified angular range in this condition.

When the bedpan unit 22 and, in its turn, the bedpan 10 is descended after use of the bedpan 10, the bedpan unit 22 retracts to the end position of retraction during which course of retraction the bedpan unit 22 and the slider 120 are temporally coupled at their respective coupling portions 124, 125 and the rear end of the slider 120 being in a raised condition, and the retraction of the bedpan unit 22 makes the stopper opposing portion 128 terminate with the bedpan unit 22 after passing above the stopper 127. Thereafter, the engagement between the respective coupling portions 124, 125 is released when the bedpan unit 22 (bedpan 10) descends along the arc-like orbit to once remote from the slider 120, and the slider 120 is thereafter seated at the halted position at which the stopper 127 acts to await the next occasion of using the bedpan substantially at the same position.

Figure 24:
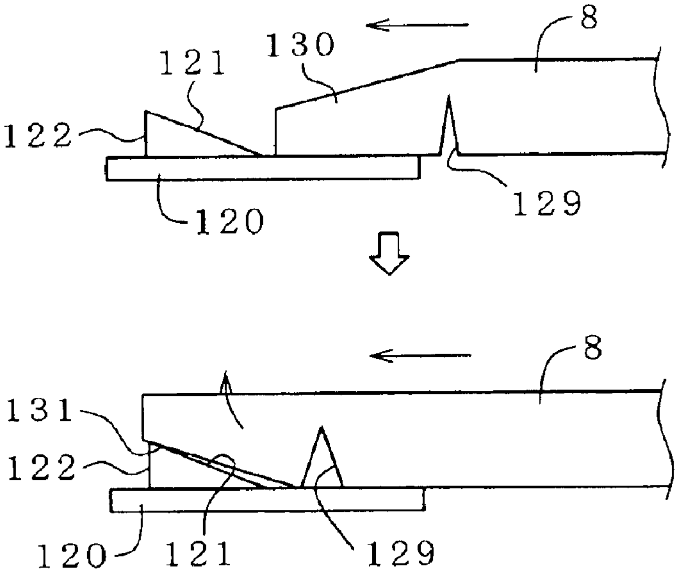
FIG. 24 is a view for explaining actions in which the tip end portion of the split mattress is finally pushed upward while moving the same forward.

On the other hand, after the bedpan unit 22 has descended to the descended position, the bedpan unit 22 moves forward by a small distance in the final stage. As illustrated in FIG. 24, the tip end portion of the split mattress 8 will at this time be located on the slider 120 at this time, and when the split mattress 8 that has returned to the flattened condition moves forward together with the bedpan unit 22, the split mattress 8 moves forward on the slider 120. The slider 120 will be maintained in the halted position since the stopper opposing portion 128 of the slider 120 will abut against the stopper 127 of the bed main body 1. The tip end portion of the split mattress 8 will climb onto the inclined surface 121 of the slider 120 to be lifted (to be raised to rotate upwardly) and returns to the original position while being pushed against the proximity of the pubic region or the hip portion of a care-receiving person from underneath. The split mattress 8 is formed with a slit 129 for enabling easy upward and downward rotation of its own tip end portion 130, and an inclined surface 131 that substantially corresponds to the inclined surface 121 of the slider 120 in a condition in which the upper surface of the split mattress 8 becomes substantially flat is formed at the tip end portion 130 of the split mattress 8.

It should be noted that in the course of forward movement of the split mattress 8, moving resistance of the split mattress 8 acts on the stay 47 coupled to the split mattress 8 such that the stay 47 becomes a load on the forwardly moving bedpan unit 22; however, since the integrality between the stay 47 and the bedpan unit 22 will be maintained after the shaft portion 51 on the lower end portion of the stay 47 has abutted against the rear end of the elastic stopper member 52, the stay 47 and, in its turn, the split mattress 8 is allowed to move forward in accordance with the forward movement of the bedpan unit 22.

What is claimed is:

1. A care bed, comprising:

a bed main body provided with an opening for elevating a bedpan, a bedpan assembled downward of the bed main body and supported in a freely elevating manner with respect to the bed main body, a bedpan elevating device that is moved between a lifted position in which the bedpan is lifted through the opening of the bed main body to above the bed surface and a descended position in which it is stored downward of the bed main body, and an excrement collecting device for sucking and collecting excrements from the bedpan, wherein the bed main body is provided with a split mattress that covers the opening in normal conditions and that is pushed upward through lifting force of the bedpan when lifting the bedpan, wherein the split mattress is arranged in that it forms a flat mattress surface together with its peripheral mattress portion in normal conditions, in that it is raised in a suspended manner with respect to the peripheral mattress portion when lifting the bedpan and is maintained in this condition as long as the bedpan is in use, and in that it is descended together with the bedpan when descending the bedpan and assumes a form of a lid covering the opening of the bed main body after the bedpan has passed through, wherein the bedpan is supported in a freely elevating manner with respect to the bed main body while the bedpan is also supported to be freely sliding in a direction that is in line with the bed surface when in the lifted position, and wherein the bed is further provided with a bedpan sliding device for sliding the bedpan in the lifted position in a direction that is in line with the bed surface, and wherein a push up member such as a stay for pushing the split mattress up at the time of lifting the bedpan is provided to be relatively approaching to and separating from the bedpan in a direction that is in line with the bed surface, and wherein the bedpan is allowed to move to the pubic region side of a care-receiving person when the bedpan is in the lifted position with the push up member being in a halted condition while raising the split mattress.

2. The care bed as claimed in claim 1, wherein the bedpan is supported through an elevating base as to be freely elevating with respect to the bed main body, the elevating base being coupled to a frame of a bedpan unit that is provided to be freely sliding with respect to the bed main body through a parallel link mechanism; wherein an elevation driving device for swing driving the bedpan between the lifted position in which it is located above the bed main body through the parallel link mechanism and the descended position in which it is stored downward of the bed main body is provided whereas on the other hand, the bedpan is supported in a freely sliding manner with respect to the bed main body through the bedpan unit and a slide driving device for sliding the bedpan in the lifted position through the bedpan unit is provided.

3. The care bed as claimed in claim 1, wherein the excrement collecting device for sucking and collecting excrements from the bedpan includes a suction hose connected to the bedpan for sucking excrements, a suction device that is connected to the hose for setting the interior of the hose to negative pressure so as to suck and transfer the excrements through the hose, an excrement tank for collecting excrements that are transported through the hose, and an excrement tank holder for fixing the excrement tank in a freely attachable/detachable manner.

4. The care bed as claimed in claim 3, comprising:

a warm water tank for storing warm water for cleaning, a cleaning hose connecting the warm water tank with the bedpan for supplying warm water to a warm water jetting outlet so as to clean one's pubic region after excretion, an excrement sucking hose connecting the bedpan with the excrement tank for sucking and collecting excrements and waste water after cleaning from the bedpan, a fan motor for driving a fan that generates negative pressure on the excrement sucking hose and for circulating air within a circulating conduit, and a warm water pressurizing conduit for introducing a part of air circulating within the circulating conduit to a warm water tank side and pressurizing the warm water of the warm water tank so as to supply the same to the warm water jetting outlet of the bedpan.

5. The care bed as claimed in claim 4, wherein water of the warm water tank is used in common as washing water and cleaning water and wherein the cleaning hose to the bedpan also serves as a washing water hose.

6. The care bed as claimed in claim 3, comprising:

a warm water tank for storing warm water, a cleaning hose connecting the warm water tank with the bedpan for supplying warm water to a warm water jetting outlet so as to clean one's pubic region after excretion, an air hose for drying connected to an air-blowing outlet of the bedpan for supplying warm air for drying one's pubic region after cleaning to the air-blowing outlet of the bedpan, an excrement sucking hose connecting the bedpan with the excrement tank for sucking and collecting excrements and waste water after cleaning from the bedpan, a fan motor for driving a fan that generates negative pressure on the excrement sucking hose and for circulating air within a circulating conduit, and a warm water pressurizing conduit for introducing a part of air circulating within the circulating conduit to a warm water tank side and pressurizing the warm water of the warm water tank so as to supply the same to the warm water jetting outlet of the bedpan, wherein a part of air circuiting through the circulating conduit is introduced to the air hose for drying and the introduced air is supplied to the bedpan through the air hose for drying.

7. The care bed as claimed in claim 1, wherein a washing water supplying device for supplying washing water for washing excrements to a washing water discharge outlet of the bedpan is provided, wherein waste water after washing is collected through the excrement collecting device together with the excrements.

8. The care bed as claimed in claim 1, wherein a cleaning device for supplying warm water for cleaning one's pubic region after excretion from a warm water tank to a discharge outlet within the bedpan and for jetting the same through the discharge outlet is provided, wherein waste water after cleaning is received by the bedpan and collected through the excrement collecting device.

9. The care bed as claimed in claim 1, wherein the bedpan comprises an opening for receiving excrements when being located to oppose one's pubic region and wherein a cover is provided to extend frontward from an upper portion of the opening, the cover being held by a holding mechanism which angle is adjustable, either in a multi-staged or non-staged manner, so as to adjust the size of the opening and to shield one's pubic region to be hardly visible from above.

10. The care bed as claimed in claim 1, wherein the bedpan comprises an opening for receiving excrements when being located to oppose one's pubic region and wherein an elastic member is provided on a part or the entire peripheral portion of the opening such that the elastic member may contact peripheries of pubic regions of a care-receiving person.

11. The care bed as claimed in claim 1, comprising:

an opening that is pressed against or disposed to oppose a pubic region of a care-receiving person for receiving excrements, and an inner side of the opening being provided with a front-sided bottom portion that extends in a substantially horizontal manner rearward from a front end and that is surrounded by a low bottom wall portion, and a rear-sided rising wall portion that rises substantially upward from rear-side of the front-sided bottom portion and both sides of which are surrounded by a low side wall portion, wherein a rearward facing washing water outlet for discharging washing water for processing excrements in a rearward direction is formed at a bottom wall portion at a tip end of the front-sided bottom portion whereas a suction inlet for sucking excrements and washing water is formed at a lower end portion of the rear sided rising wall portion rearward of the washing water outlet, wherein a cleaning water outlet for jetting cleaning water for cleaning one's pubic region in a frontward direction is formed further upward of the suction inlet of the rear-sided rising wall portion and the cleaning water is sucked by the suction inlet, and wherein, the front-sided bottom portion is provided, in addition to the rearward facing washing water outlet formed at the front end, with washing water outlets for centering, which are located further rearward of the washing water outlet, for discharging washing water for processing excrements from both wall portions of the front-sided bottom portion towards the center such that excrements are guided to the suction inlet through cooperative actions of washing water, which is discharged rearwards from the rearward facing washing water outlet at the front end, and washing water, which is discharged from the washing water outlet for centering on both sides towards the center.

12. A care bed, comprising:

a bed main body provided with an opening for elevating a bedpan, a bedpan assembled downward of the bed main body and supported in a freely elevating manner with respect to the bed main body, a bedpan elevating device that is moved between a lifted position in which the bedpan is lifted through the opening of the bed main body to above the bed surface and a descended position in which it is stored downward of the bed main body, and an excrement collecting device for sucking and collecting excrements from the bedpan, wherein a circulating conduit is formed for accumulating, at the time of collecting the sucked excrements into the collecting device together with air, the excrements in an excrement tank while only air is sucked to a sucking driving unit through a suction conduit and wherein pressurized air that has passed through the suction driving unit and that has become positive pressure on a downstream side is introduced from the suction driving unit to a downstream conduit and wherein the pressurized air is circulated to a bedpan side as air for sending out washing water and/or cleaning water to the bedpan, while a releasing unit for releasing a part of the pressurized air is also provided.

13. The care bed as claimed in claim 12, wherein a deodorizing chamber for reducing odor of circuiting air passing through the excrement tank is assembled to a part of the circulating conduit such that air that has passed through the excrement tank is circuited upon passing through the deodorizing chamber.

14. The care bed as claimed in claim 13, wherein the circulating conduit is provided, as the releasing unit, with a discharge outlet for discharging a part of the circulating air to the exterior and an adjusting valve for adjusting discharge amount of air through the discharge outlet.

15. The care bed as claimed in claim 12, comprising:

an opening that is pressed against or disposed to oppose a pubic region of a care-receiving person for receiving excrements, and an inner side of the opening being provided with a front-sided bottom portion that extends in a substantially horizontal manner rearward from a front end and that is surrounded by a low bottom wall portion, and a rear-sided rising wall portion that rises substantially upward from rear-side of the front-sided bottom portion and both sides of which are surrounded by a low side wall portion, wherein a rearward facing washing water outlet for discharging washing water for processing excrements in a rearward direction is formed at a bottom wall portion at a tip end of the front-sided bottom portion whereas a suction inlet for sucking excrements and washing water is formed at a lower end portion of the rear-sided rising wall portion rearward of the washing water outlet, wherein a cleaning water outlet for jetting cleaning water for cleaning one's pubic region in a frontward direction is formed further upward of the suction inlet of the rear-sided rising wall portion and the cleaning water is sucked by the suction inlet, and wherein, the front-sided bottom portion is provided, in addition to the rearward facing washing water outlet formed at the front end, with washing water outlets for centering, which are located further rearward of the washing water outlet, for discharging washing water for processing excrements from both wall portions of the front-sided bottom portion towards the center such that excrements are guided to the suction inlet through cooperative actions of washing water, which is discharged rearwards from the rearward facing washing water outlet at the front end, and washing water, which is discharged from the washing water outlet for centering on both sides towards the center.

* * * * *